US011325292B2

(12) United States Patent
De Nadai et al.

(10) Patent No.: US 11,325,292 B2
(45) Date of Patent: May 10, 2022

(54) CONDITIONED JACK FOR INJECTION MOLDING APPARATUS OF PLASTIC MATERIALS

(71) Applicant: INGLASS S.p.A., San Polo di Piave (IT)

(72) Inventors: Massimo De Nadai, San Polo di Piave (IT); Nico Trevisiol, San Polo di Piave (IT)

(73) Assignee: INGLASS S.p.A.

( * ) Notice: Subject to any disclaimer, the term of this patent is extended or adjusted under 35 U.S.C. 154(b) by 0 days.

(21) Appl. No.: 17/056,844

(22) PCT Filed: Dec. 19, 2019

(86) PCT No.: PCT/IB2019/061101
§ 371 (c)(1),
(2) Date: Nov. 19, 2020

(87) PCT Pub. No.: WO2020/148591
PCT Pub. Date: Jul. 23, 2020

(65) Prior Publication Data
US 2021/0331363 A1 Oct. 28, 2021

(30) Foreign Application Priority Data
Jan. 15, 2019 (IT) .................. 102019000000647

(51) Int. Cl.
*B29C 45/28* (2006.01)
(52) U.S. Cl.
CPC .................. *B29C 45/281* (2013.01)

(58) Field of Classification Search
CPC .................. B29C 45/281; B29C 45/72; B29C 2045/7271
See application file for complete search history.

(56) References Cited

U.S. PATENT DOCUMENTS 4,747,770 A 5/1988 Schmidt

FOREIGN PATENT DOCUMENTS

| CN | 201544424 U | 8/2010 |
| CN | 202468521 U | 10/2012 |
| CN | 202607978 U | 12/2012 |
| CN | 104033446 A | 9/2014 |
| EP | 1223020 A1 | 7/2002 |

OTHER PUBLICATIONS

International Search Report dated Mar. 30, 2020. 11 pages.

*Primary Examiner* — James Sanders
(74) *Attorney, Agent, or Firm* — RMCK Law Group PLC

(57) ABSTRACT

A conditioned jack for actuating a valve pin of an injector for apparatus for injection molding of plastic materials, includes a cylinder having at least one thrust chamber delimited on one side by a first bottom and on the other side by a second bottom, a support of the cylinder for securing the jack to the molding apparatus, and a flow circuit for a conditioning fluid of the jack, which is formed within a bushing which constitutes said second bottom, is separable from the cylinder and is provided with inner and outer annular sealing gaskets of respectively the cylinder and a stem.

4 Claims, 2 Drawing Sheets

CONDITIONED JACK FOR INJECTION MOLDING APPARATUS OF PLASTIC MATERIALS

CROSS-REFERENCE TO RELATED APPLICATIONS

This application is a 371 National Stage of International Application No. PCT/IB2019/061101, filed Dec. 19, 2019, which claims priority to Italian Patent Application No. 102019000000647 filed Jan. 15, 2019. The disclosure of each of the above applications is incorporated herein by reference in its entirety.

FIELD OF THE INVENTION

The present invention generally regards actuators for apparatus for injection molding of plastic materials, and more particularly it regards a jack for actuating the valve pin of an injector for such apparatus.

STATE OF THE PRIOR ART

Such jacks may be of the fluid or electric type: in the first case, they typically comprise a cylinder having at least one thrust chamber delimited on one side by a first bottom and on the other by a second bottom and in which a piston carrying at least one stem sealingly slidable axially through the second bottom for connection to the valve pin of the injector is movable.

The jack, normally applied to the distributor or hot runner of the fluid plastic material to be injected, is subjected to high temperatures and therefore requires a cooling or conditioning system for its correct operation.

According to the prior art, the conditioning system consists of a flow circuit for a refrigerant, currently obtained according to two conventional solutions: channels formed by means of holes directly in the cylinder body, or arranged in an auxiliary annular insert interposed between the cylinder and the jack fixing support.

The first solution is constructively complex and difficult to maintain as regards the periodic cleaning of the flow channels for the removal of limestone. Besides being also relatively complicated, the second solution entails a greater axial overall dimension of the jack-support assembly which is poorly compatible with the spaces normally available in the molding apparatus.

Document CN202468521U reveals a hydraulic jack conditioned by means of a fluid flow circuit. The circuit comprises a pair of channels formed in a lower bottom of the jack and a pair of axial channels formed in the lateral wall of the cylinder which connect the inlet and outlet holes of the refrigerant fluid, provided in the upper portion of the cylinder, to the channels of the bottom. Such solution is difficult to implement and it does not solve the problem of facilitating the periodic cleaning of the flow channels for the removal of limestone.

SUMMARY OF THE INVENTION

The object of the invention is to overcome the aforementioned drawbacks and to provide a conditioned jack of the type defined above which is simpler to manufacture, easier to maintain and smaller in size.

According to the invention, this object is achieved by virtue of the fact that the flow circuit of the refrigerant is formed in a bushing which constitutes said second bottom and can be separated from the cylinder and is provided with internal and external sealing gaskets respectively of the cylinder and of the stem.

Thanks to this solution idea, the conditioned jack according to the invention, although consisting in an essential number of components, is capable of ensuring efficient conditioning basically without entailing any size increase with respect to a similar non-conditioned jack.

The manufacturing cost of the jack is also low, since the bushing with the flow circuit can be manufactured by means of low-cost casting, and the possible restoration in the event of occlusion of the flow circuit by limestone can be carried out simply by removing the bushing and replacing it with a new bushing.

BRIEF DESCRIPTION OF THE DRAWINGS

The invention will now be described in detail, purely by way of non-limiting example, with reference to the attached drawings, wherein.

DETAILED DESCRIPTION OF THE INVENTION

Figure 3:
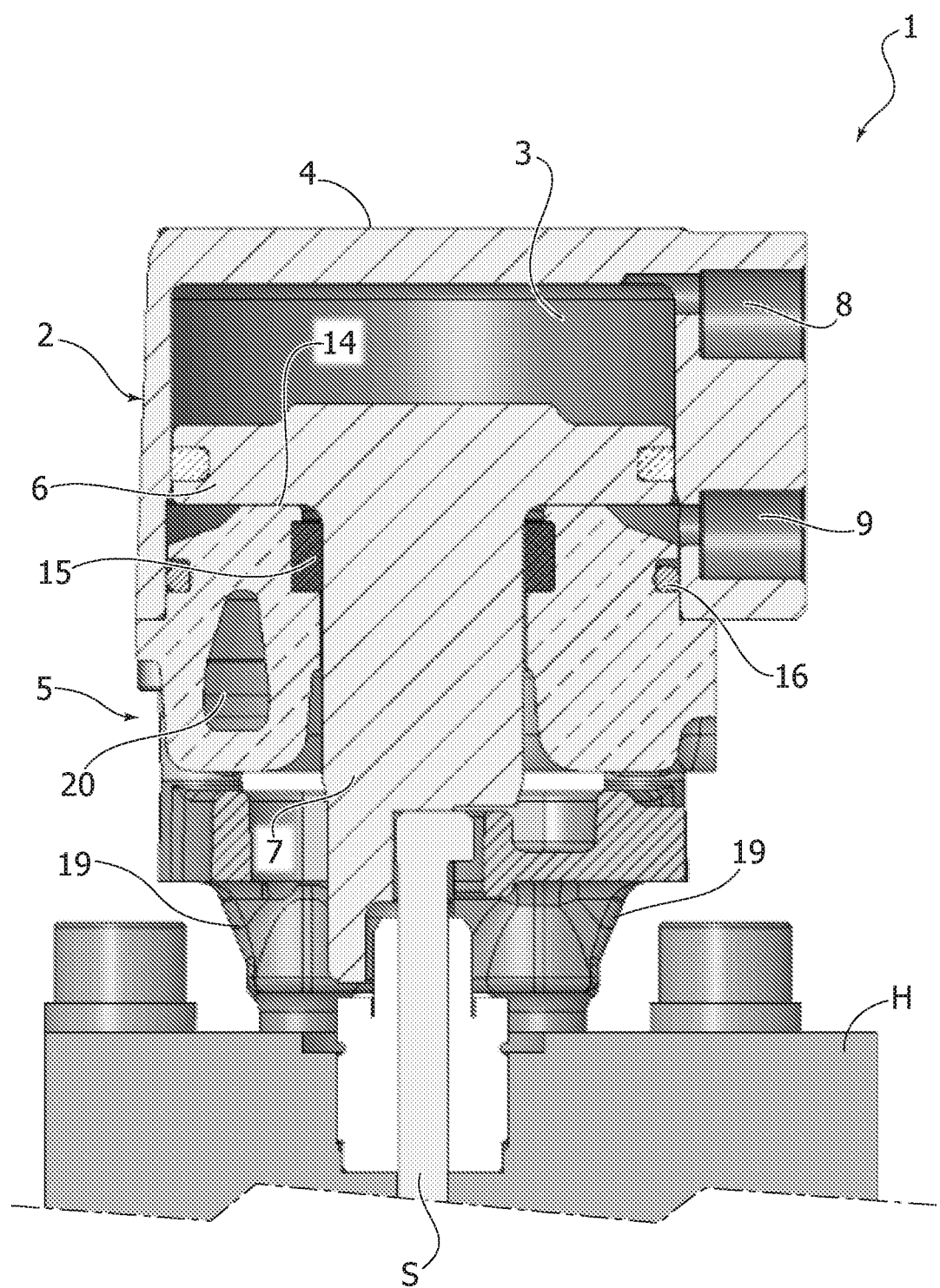
FIG. 3 is an axial section schematic view of the jack.

The example of the conditioned jack according to the invention shown in the drawings expressly refers to a pneumatic jack used for the actuation of the valve pin, partially indicated with S in FIG. 3, of an injector for apparatus for injection molding of plastic materials. However, it should be observed that the invention is equally applicable to a hydraulic or even an electrical jack having the same function or similar functions in apparatus thus made.

The jack is indicated in its entirety with 1 and it comprises, in a per se generally known manner, a cylinder 2 inside which a thrust chamber 3 is formed, delimited on one side by a first normally closed bottom 4, which in the illustrated example is formed integrally with the cylinder 2 but could consist of a removable lid, and on the other by a second normally open bottom 5. Sealingly slidable in the thrust chamber 3 is a piston 6 provided with a stem 7 which sealingly passes through the second bottom 5 and is connected, in a per se known manner, to the vacant end of the valve pin S. The stem 7 could also actuate several valve pins.

The piston 6 may be provided with a second stem (not shown) extending from the opposite side to the stem 7 through the bottom 4 for the actuation of a sensor or end-stop or the like.

On one side and on the other side of the piston 6, the thrust chamber 3 communicates with a pair of alternatingly inlet and outlet fittings 8, 9 connected to a pneumatic supply circuit, controlled in a per se known manner.

Indicated with reference 10 is a support fixed to the cylinder 2, for example by means of axial screws 18 inserted into integral peripheral tubular columns 11 and 19, for fixing the jack 1, for example on the distributor or hot runner H of the molding apparatus.

Figure 1:
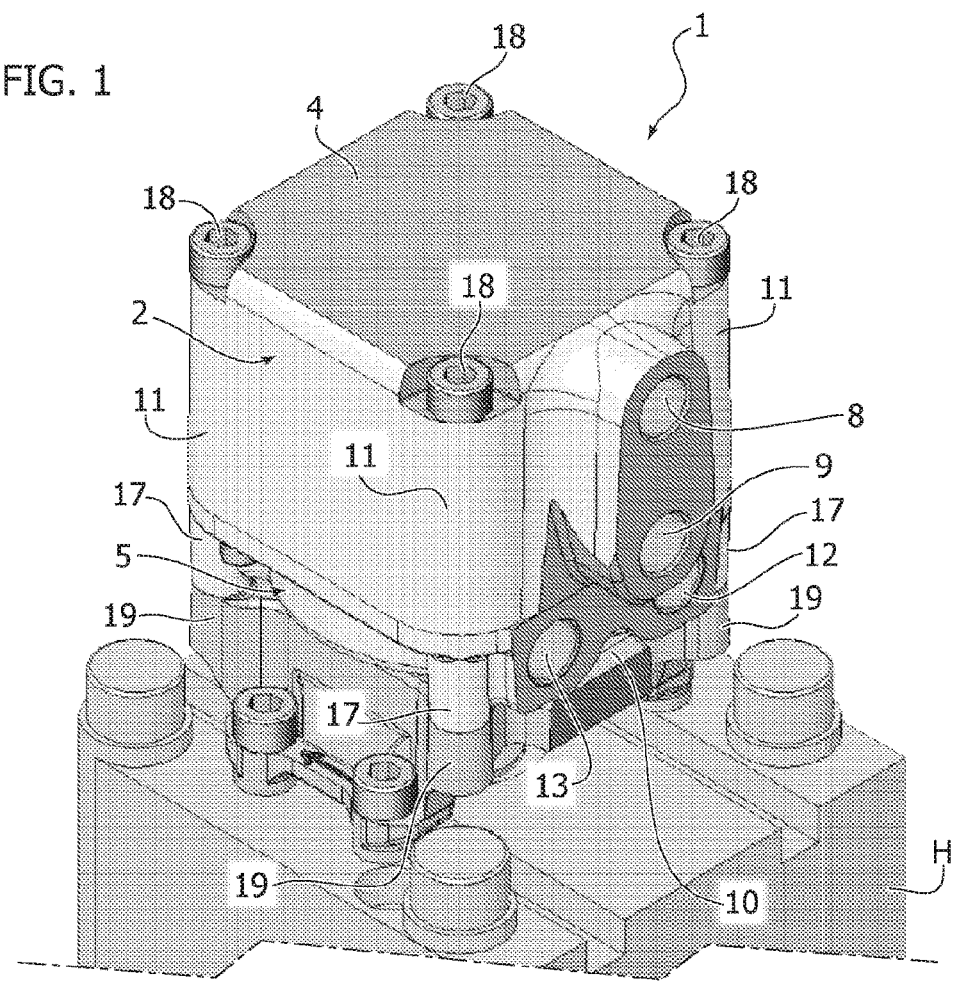
FIG. 1 is a schematic perspective view of a conditioned jack according to the invention, of the fluid type, applied to the hot runner of an apparatus for injection molding of plastic materials.

According to the distinctive characteristic of the invention, the second bottom 5 consists of a bushing inside which there is formed a cavity 20, which extends angularly between an inlet fitting 12 and an outlet fitting 13 for a conditioning fluid, typically water or even a refrigerant gas. In the case of the illustrated example, the inlet and outlet fittings 12, 13 are aligned in a plane orthogonal to the axis of the cylinder 2 and they are both arranged on the side thereof corresponding to the inlet/outlet 8, 9 which, as shown in FIG. 1, are instead are aligned with respect to each other parallel to the axis of the cylinder 2.

Figure 2:
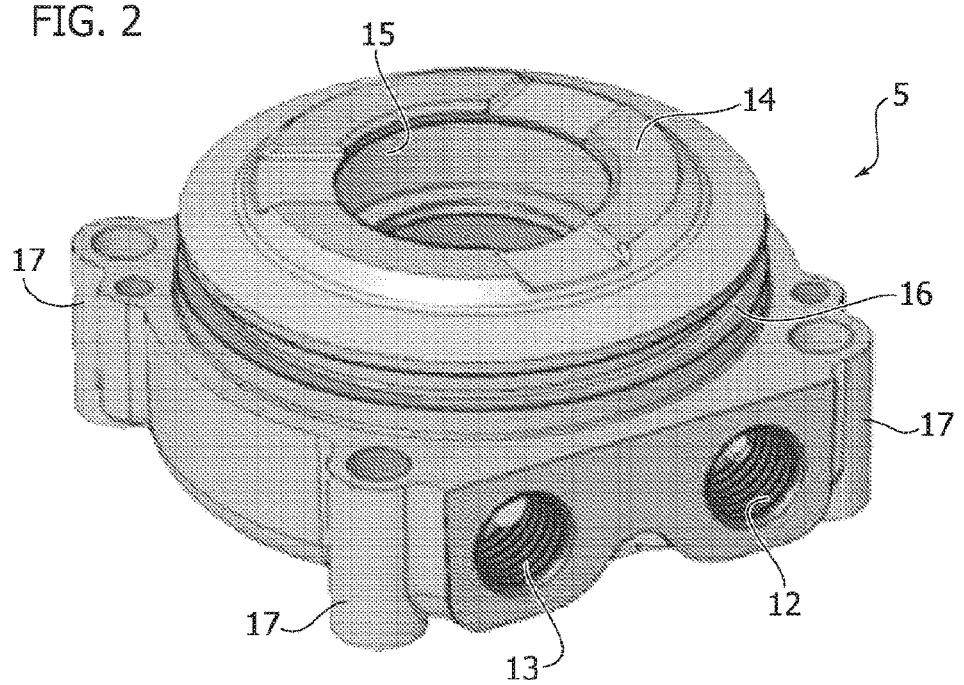
FIG. 2 shows—in an enlarged scale—a detail of FIG. 1.

As better observable in FIG. 2, the bushing 5, which is conveniently obtained by casting, has a substantially flat end face 14, beneath which an inner annular gasket 15 is housed in slidable sealing contact with the stem 7. An outer annular gasket 16 is at sealing contact against the inner wall of the cylinder 2.

When operating, the conditioning fluid circulating through the cavity 20 of the bushing 5 allows to effectively condition the jack 1 with a relatively simple, economical and modular construction: in the case of accumulation of limescale or other material inside the channel 20, the bushing 5 can be easily removed and replaced with a new bushing.

The bushing 5 is fixed to the cylinder 2 by means of the support using the same screws 18 inserted through corresponding integral tubular columns 17 of the bushing 5 interposed between the tubular columns 11 and 19.

Obviously, the construction details and the embodiments may widely vary with respect to what has been described and illustrated, without departing from the scope of protection of the present invention as defined in the claims that follow. Thus, for example, although in the case of the illustrated example the bushing 5 is fixed using the same axial screws 18, different solutions can be envisaged in which the fixing occurs by means of auxiliary elements such as brackets, radial screws and the like.

The invention claimed is:

1. A conditioned jack for actuating a valve pin of an injector for a molding apparatus for injection molding of plastic material, comprising:
    a cylinder having at least one thrust chamber delimited on one side by a first bottom and on the other side by a second bottom and within which a piston is movable which is provided with at least one stem sealingly slidable axially through the second bottom for connection to at least said valve pin,
    a support of the cylinder for securing the conditioned jack to the molding apparatus, and
    a flow circuit for a conditioning fluid of the conditioned jack,
    wherein said flow circuit: is entirely formed within a bushing which constitutes said second bottom, is separable from the cylinder and is provided with inner and outer annular sealing gaskets of respectively the cylinder and the at least one stem.

2. The conditioned jack according to claim 1, wherein the bushing constituting said second bottom is separably secured to the cylinder through said support.

3. The conditioned jack according to claim 2, wherein the bushing constituting said second bottom is fixed to the cylinder and to the support by axial screws fitted through respective peripheral tubular columns.

4. The conditioned jack according to claim 1, wherein the conditioned jack is pneumatic, hydraulic or electric.

* * * * *